Jan. 28, 1936.　　　　H. N. ATWOOD　　　　2,029,048
TUBULAR STRUCTURAL UNIT AND METHOD OF MAKING THE SAME
Filed July 31, 1934
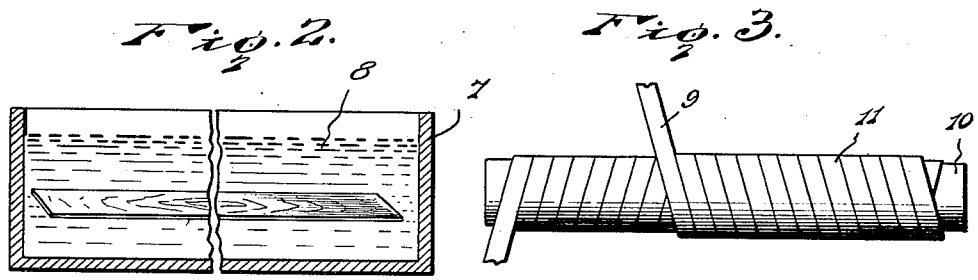
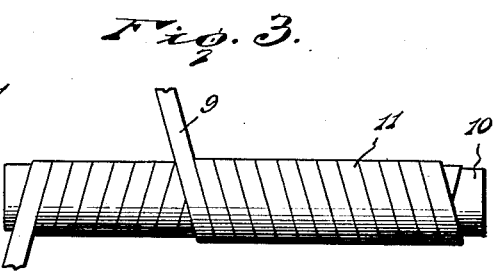
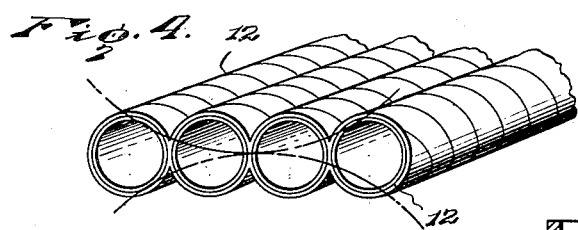
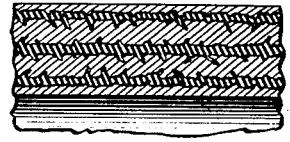
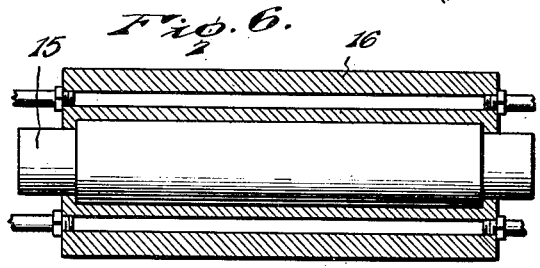
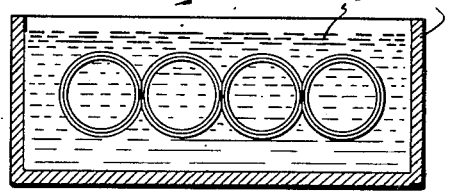
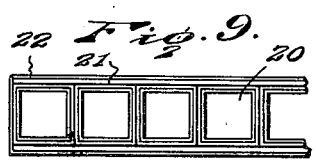
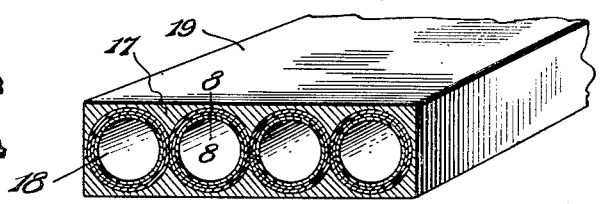
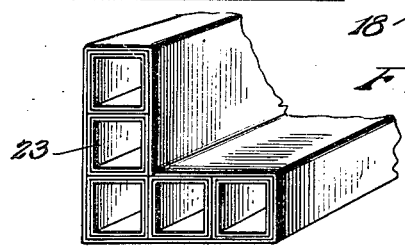
Inventor
Harry N. Atwood.
By Lacey & Lacey,
Attorneys Patented Jan. 28, 1936

2,029,048

UNITED STATES PATENT OFFICE 2,029,048

TUBULAR STRUCTURAL UNIT AND METHOD OF MAKING THE SAME

Harry N. Atwood, South Lyndeboro, N. H.

Application July 31, 1934, Serial No. 737,838

9 Claims. (Cl. 154—2)

This invention relates to a tubular structural unit and method of making the same.

The object of the invention is to provide a laminated structural unit which is light in weight and strong and durable in construction, thereby rendering it particularly adapted for use in the construction of all kinds of air and marine craft and for various other purposes.

A further object of the invention is to provide a structural unit formed of laminated tubes preferably impregnated with rubber and united one to the other in substantially flat formation to form a cellular structure, the exterior of which is coated with cellulosic plastic material to impart a case-hardened finish thereto.

A further object of the invention is to so construct, assemble and unite the laminated tubes as to permit flexing or bending of the assembled structure to conform to any desired shape so that when the cellulosic material is applied and the structure subjected to heat and pressure, it will take a fixed or permanent form.

The invention consists in winding, preferably rubber impregnated strips of wood veneer or other fibrous material, around suitable shaping mandrels in superposed layers to form independent laminated tubes, pressing the tubes together in flat formation to cause the adjacent adhesive surfaces to unite and permit flexing or shaping of the assembled structure; immersing the assembled structure in an acetone solution containing a small percentage of cellulosic plastic material and subsequently inserting finishing mandrels within the tubes and subjecting the structure to heat and pressure to vulcanize the parts and cause them to retain a fixed definite shape.

In the accompanying drawing forming a part of this specification and in which similar numerals of reference indicate corresponding parts in all the views of the drawing:

Figure 1 is a perspective view of a strip of natural wood veneer prior to impregnating the same with rubber.

Figure 2 is a vertical sectional view showing the veneer strip immersed in a rubber or latex solution.

Figure 3 is a side elevation showing the manner of coiling or wrapping the rubberized veneer on a shaping mandrel.

Figure 4 is a perspective view, partly broken away showing several of the tubes assembled side by side and bonded together, the flexing of the tubes being indicated by dot and dash lines.

Figure 5 is a vertical sectional view showing the assembled tubes immersed in an acetone solution containing cellulosic plastic material.

Figure 6 is a vertical sectional view, partly in section, showing the assembled tubes supported on mandrels between pressing and heating elements to effect vulcanization.

Figure 7 is a sectional perspective view of a portion of the completed structural unit.

Figure 8 is a detail sectional view taken on the line 8—8 of Figure 7 showing how the rubber and cellulosic plastic material is bonded to the wood.

Figure 9 is an end elevation illustrating a modified form of the invention.

Figure 10 is a detail perspective showing the tubes assembled in a different manner.

According to the present invention, I take thin strips 6 of fibrous material, preferably natural wood veneer, and these strips may be, of any desired length, width and thickness, although it is preferred that the thickness of the strips be approximately one-forty-eighth of an inch. The strip or strips 6 are then preferably placed in a tank 7 containing a rubber or latex solution 8 and allowed to remain therein until the wood is impregnated or partially impregnated with the rubber, at which time the strips will present a sticky adhesive surface, indicated at 9. The rubberized strips are then wound or coiled around a cylindrical mandrel 10, although a mandrel of any other desired cross sectional shape may be employed. The wood veneer strips are preferably wound in spiral superposed layers 11 with the adjacent edges of the veneer strips of the foundation layer abutting and with the next succeeding layer overlapping the foundation layer and in intimate contact therewith so as to form a tubular member 12. Any number of layers of veneer may be employed according to the strength and stability desired. Inasmuch as the veneer strips are surfaced with the rubber when the strips are coiled around the mandrel, a close adhesion between the strips will result and the body of the tube will be formed, in effect, of alternate layers of wood and rubber securely bonded together.

After having formed the tubes in this manner, said tubes are assembled side by side with their adhesive surfaces in intimate contact with each other, as best shown in Figure 4 of the drawing, and, if desired, while the tubes are thus assembled the contacting surfaces may be vulcanized so that a flexible structure is produced which may be bent in any direction, as indicated by the dot and dash lines in Figure 4 of the drawing, and thus permit the assembled tubes to assume any desired shape. If the structural unit is to be flat, the tubes are assembled in horizontal alinement with each other and then immersed in a tank 13 of acetone solution 14 containing approximately five percent, by weight, of solid cellulosic plastic material such as cellulose acetate, cellulose nitrate or cellulose ester and allowed to remain therein until the cellulose material entirely covers the inner and outer surfaces of the tubes so as to form a hard protective coating or jacket therefor. The assembled tubes thus treated are then placed on auxiliary or finishing mandrels 15 and said assembled tubes inserted between coacting pressing elements or molds 16 heated to the desired temperature and the tubes subjected to heat and pressure to vulcanize the parts and retain the assembled tubes in permanent form.

If a curved unit is desired, the assembled tubes may be flexed to the desired curvature or shape before immersion in the acetone solution and subsequently dipped in said solution and subjected to heat and pressure whereby the hard protective jacket or coating of cellulosic material will retain the assembled tubes permanently in the desired shape. The application of heat and pressure to the tubes not only serves to vulcanize the rubber and cause it to penetrate the fibers of the wood but also causes the plastic material to flow uniformly over the exterior thereof and enter and cover any cracks or interstices which may not have been filled with the rubber. The plastic material also fills the spaces between the tubes, as indicated at 17, and provides a smooth hard water-proof finish to the structure, thereby enabling it to withstand the deleterious action of the elements for an indefinite period.

By reference to Figure 7 of the drawing, it will be noted that each of the assembled tubes has an inner coating 18 of cellulosic plastic material and an outer coating 19 of the same material and between which are interposed spirally arranged rubber impregnated wood veneer strips thereby giving the product the necessary toughness and strength to resist tensile and torsional strains when in use.

A structural unit constructed in accordance with the present invention is light in weight and tough in texture so that it is particularly adapted for use in the fabrication of the fuselage and other parts of air and water craft. Furthermore, as the structural unit is cellular in formation, it is extremely buoyant and will prevent sinking of air craft in case of disaster when flying over a body of water.

While it is preferred to impregnate the wood veneer strips with rubber prior to the application of the cellulosic plastic material thereto, if desired, in certain cases and under certain conditions, the rubber may be omitted and the acetone solution applied directly to the wood veneer strips prior to coiling the same in tube form and during and after said coiling operation and I therefore do not desire to limit the invention in this respect.

In Figure 9 of the drawing, there is illustrated a modified form of the invention in which the tubular members 20 are preferably rectangular in cross section. In this form of the device, the structure is preferably reinforced and strengthened by the provision of upper and lower strips 21 of wood veneer impregnated with rubber and coated with a cellulosic plastic material 22 in the manner previously stated.

In Figure 10 of the drawing, there is shown a further modification in which the tubes 23 are assembled in angular formation, this construction being particularly adapted for use in the fabrication of sound-proof cabinets and similar structures.

While a product constructed in accordance with the present invention is especially adapted for use in the fabrication of aeroplane and other air and water craft, it will, of course, be understood that said product may be used in the construction of buildings or wherever a structural unit of this character is found necessary or desirable. It will also be understood that the structural units may be made in different sizes and shapes without departing from the spirit of the invention.

Having thus described the invention, I claim:

1. A structural unit comprising tubular members bonded together side by side to form a substantially flat built up structure, and a coating consisting of an acetone solution containing cellulosic plastic material covering said built up structure.

2. A structural unit comprising tubular members assembled side by side with their adjacent surfaces in intimate contact and bonded together, and a coating of cellulosic plastic material covering the assembled tubes and bonded thereto.

3. A structural unit comprising a plurality of tubular members formed of rubber impregnated wood veneer laminations, said members being assembled side by side and bonded together by the rubber with which the laminations are impregnated, and cellulosic plastic material forming a hard smooth protective jacket for the assembled tubes and filling the spaces between the tubes and bonded thereto.

4. A structural unit comprising a plurality of tubular members assembled side by side and united by a flexible bonding agent to allow flexing of the assembled tubes and permit them to assure a desired shape, and a coating of cellulosic plastic material covering the assembled tubes for holding said tubes in fixed position and providing a hard exterior protective jacket therefor.

5. A structural unit comprising a plurality of independent tubular members formed of rubber impregnated wood veneer strips, said tubes being assembled side by side with their adjacent faces in contact and bonded together by the rubber with which the strips are impregnated, and cellulosic plastic material forming a coating for the inner walls of the tubular members and the outer walls thereof, said cellulosic material filling the spaces between the tubes and forming a hard exterior surface entirely surrounding and covering the tubes.

6. A structural unit comprising a plurality of tubular members impregnated with rubber and assembled side by side with their adjacent adhesive surfaces in intimate contact and bonded together, rubberized wood veneer reinforcing members disposed on opposite sides of the tubular members, and a protective jacket of cellulosic plastic material surrounding the tubes and reinforcing members and intimately connected with and bonded thereto.

7. The method of making a tubular structural unit which consists in winding strips of wood veneer on a shaping mandrel in superposed spiral layers to form a tubular member, assembling several of said tubular members side by side with their adjacent surfaces in bonding contact, applying an acetone solution containing cellulosic plastic material to the outer surfaces of the assembled tubes, and subsequently subjecting the assembled tubes to heat and pressure.

8. The method of making a tubular structural unit which consists in covering a strip of wood veneer with a rubber solution to impregnate the wood with rubber and impart thereto a surface adhesion, winding the veneer strip on a shaping mandrel to form a tubular member, assembling several of said tubular members with their adhesive surfaces in contact, immersing the assembled tubular members in an acetone solution containing cellulosic plastic material to entirely cover the inner and outer surfaces of the assembled tubes, and subsequently subjecting the assembled tubes thus treated to heat and pressure.

9. The method of making a tubular structural unit which consists in impregnating a strip of wood veneer with a rubber solution, winding the veneer strip on a shaping mandrel to form a tubular member, assembling several of said tubular members side by side with the adjacent contacting faces of the members bonded together, immersing the assembled tubular members in an acetone solution containing a small percentage of cellulosic plastic material to cause the cellulosic plastic material to cover the interior and exterior of the tubular members and fill the spaces between said members, inserting auxiliary mandrels within the tubular members, and placing the assembled tubular members while on the auxiliary mandrels between suitable pressing members and subjecting the same to heat and pressure thereby to cause the cellulosic material to entirely cover the tubular members and present a hard smooth finish.

HARRY N. ATWOOD. [L. S.]